United States Patent
Bowers et al.

(10) Patent No.: US 7,063,270 B2
(45) Date of Patent: Jun. 20, 2006

(54) MOISTURE SENSOR SPRINKLER CONTROL SYSTEMS

(76) Inventors: John R. Bowers, 4218 E. Glennaire Dr., Spokane, WA (US) 99223; John W. Bowers, 2512 Knoll Ct., Rocklin, CA (US) 95677

( * ) Notice: Subject to any disclaimer, the term of this patent is extended or adjusted under 35 U.S.C. 154(b) by 319 days.

(21) Appl. No.: 10/695,920

(22) Filed: Oct. 27, 2003

(65) Prior Publication Data

US 2005/0087620 A1    Apr. 28, 2005

(51) Int. Cl.
  B05B 17/00    (2006.01)
  B05B 12/08    (2006.01)

(52) U.S. Cl. .............. 239/1; 239/63; 239/64; 239/69; 239/70; 239/201; 137/78.3; 324/664; 324/689; 324/690; 324/696; 340/604; 73/73; 73/74

(58) Field of Classification Search ............ 239/63, 239/64, 67, 69, 70, 201, DIG. 15; 137/78.1, 137/78.2, 78.3; 324/664, 689, 690, 694, 324/696; 340/602, 604; 73/73, 74
See application file for complete search history.

(56) References Cited

U.S. PATENT DOCUMENTS

| | | | |
|---|---|---|---|
| 2,737,615 A | | 3/1956 | Roby, Jr. et al. |
| 2,768,028 A | | 10/1956 | Robinson |
| 2,812,976 A | | 11/1957 | Hasenkamp |
| 2,906,952 A | | 9/1959 | Horecky |
| 3,182,914 A | | 5/1965 | Hosier |
| 3,195,816 A | | 7/1965 | Mercer |
| 3,626,286 A | | 12/1971 | Rauchwerger |
| 3,642,204 A | | 2/1972 | McCloskey |
| 4,197,866 A | * | 4/1980 | Neal ............................ 239/63 |
| 4,216,789 A | | 8/1980 | Hasenbeck |
| 4,657,039 A | * | 4/1987 | Bireley et al. ............. 137/78.3 |
| 4,683,904 A | | 8/1987 | Iltis |
| 4,693,419 A | | 9/1987 | Weintraub et al. |
| 4,936,333 A | * | 6/1990 | Bireley ........................ 239/70 |
| 4,941,501 A | | 7/1990 | Bireley |
| 4,952,868 A | | 8/1990 | Scherer, III |
| 5,260,666 A | * | 11/1993 | Dishman et al. ............ 324/664 |
| 5,341,831 A | | 8/1994 | Zur |
| 5,424,649 A | * | 6/1995 | Gluck et al. ................ 324/690 |
| 5,546,974 A | * | 8/1996 | Bireley ........................ 239/64 |
| 5,621,669 A | | 4/1997 | Bjornsson |
| 5,749,521 A | * | 5/1998 | Lattery ........................ 239/64 |
| 5,847,568 A | | 12/1998 | Stashkiw et al. |
| 6,016,971 A | | 1/2000 | Welch et al. |
| 6,401,742 B1 | * | 6/2002 | Cramer et al. ................ 239/63 |

* cited by examiner

*Primary Examiner*—Steven J. Ganey
(74) *Attorney, Agent, or Firm*—Gregory I.P. Law; Randy A. Gregory

(57) ABSTRACT

Irrigation systems, moisture sensors and related methods having a sensor embedded in the ground to sense moisture and help control watering. The sensor is responsive to capacitance changes from ground moisture variations. The sensor uses spaced insulated electrodes which are mounted within a granular filled chamber within a water-permeable shell. The sensor is mounted as part of a ground unit that also includes a high frequency driver that excites the sensor. The ground unit further has a detector circuit which produces a moisture indicating signal based on the capacitance which varies with ground moisture. Also disclosed are controllers that electrically isolate the ground units so that reliable moisture signals can be obtained and used to control irrigation. The controllers can be configured to provide multiple zone operation using a shared controller having shared or independent moisture adjusters.

46 Claims, 7 Drawing Sheets

FIG. 3

MOISTURE SENSOR SPRINKLER CONTROL SYSTEMS

TECHNICAL FIELD

The invention relates to irrigation sensing and control systems. In particular, the invention relates to systems and methods for sensing and controlling irrigation based upon improved ground moisture sensors and related circuitry and associated techniques.

BACKGROUND OF THE INVENTION

Irrigation control systems known in the art typically employ a time clock and controller coupled to one or more electrically actuated or activated valves. These systems typically use predetermined watering time periods which are set by programming of the irrigation controller. The programming of such controllers may include dial settings, digital control settings, placement of mechanical pegs or stops, or some other manipulation of the time clock or controller settings.

When a predetermined watering start time occurs, one or more of the associated irrigation valves are opened. The irrigation valves are open for a pre-programmed watering period and then closed under the control of the time clock after such watering period has run.

Considerable inefficiency and poor performance can result when using pre-programmed watering controls as described above. For example, such watering systems typically irrigate during rain storms, thus resulting in wasted water. They also irrigate without consideration of the temperature of the air or ground, and without considering the ground moisture actually present.

Another area of concern involves multi-zone systems which may have one or more of the zones which are insufficiently watered, resulting in dry areas while other zones have sufficient or excess water. This results in particular zones within a multi-zone system which are inadequately watered, while other zones are watered to excess, thus producing dry areas, waterlogged areas, water wastage and derogatory effects on the grass or other crop being irrigated.

Conventional systems using predetermined watering time periods are adjusted to try and account for zonal variations by only using watering time as an adjustable parameter. However, the differences which are satisfactory during one season or weather period may not be satisfactory during a different season or weather period. Also, daily temperature and other daily or episodal weather fluctuations may not be adequately compensated for using watering time periods set under prior conditions and previously observed results.

Attempting to eliminate such problems under a pre-programmed, time-based watering scheme requires tedious, trial and error adjustments to the irrigation controller. These adjustments typically deliver results which are an attempt to provide proper control for the circumstances just experienced, but are not satisfactory under current changes and variable future conditions. For example, one set of adjustments made during mild weather may yield undesirable results during hotter, dryer weather conditions which may begin the day after an adjustment has been made. Thus, it is impossible to provide optimal watering using such systems and in most cases it is difficult to provide even good watering schedules in light of constantly changing seasonal, episodal and daily weather patterns and fluctuations.

Another approach is to use ground moisture sensors. Although this seems like a reasonable approach, it has been found extremely difficult to achieve with good results. Some moisture sensors have been attempted based upon detecting the electrical conductance of surrounding soil. The conductance of soil is variable dependent upon moisture content. However, variations in soil conductivity are dependent not only on moisture content but also upon the composition of the soil. The variety of different soil types and soil constituents that affect conductivity are numerous and are difficult to predict or account for in a reliable manner. Thus a system adapted for one area may not work in another.

Of particular significance are the amounts and types of salts available in a given type of soil. These vary to a great extent from one location to another. Other important causes of variations in soil conductivity are associated with variations in soil acidity or alkalinity (soil pH variations). These also have significant effects on the conductivity of the soil and make it difficult to reliably determine moisture for various soils. Accordingly, such variations make determining ground moisture using conductive sensors unreliable.

In addition to variations from soil types, pH levels and location to location, there are also significant variations over time for a given location. Further significant are common changes which may occur due to application of chemicals, such as application of fertilizers, lime, and other treatment chemicals frequently applied to lawns, crops, and other irrigated areas. These chemicals can dramatically affect the conductivity of the soil and thus prevent meaningful moisture measurements from being made using conductive and other prior types of sensors. Thus, it has been difficult or impossible to reliably measure soil moisture using prior conductive and other sensing systems.

The problems indicated above also suggest similar problems with capacitive moisture sensors and irrigation systems based thereon. As the inventors have now discovered, the above problems have been furthered by extraneous ground currents that run through the soil from electrically operated sprinkler zone control valves, electrical and telephone grounding rods, and other miscellaneous sources of electrical current that inject or induce currents into the ground. Capacitive sensors have been particularly susceptible to producing unreliable results, in part because of such stray currents.

Thus, there remains a need for an irrigation control system and related methods and apparatuses which provide improved watering control based on the actual watering needs of the irrigated zone or zones, while reducing or eliminating wasted water and preventing frequent manual adjustment of the controller due to daily, episodal or seasonal fluctuations in weather conditions. Such a system is needed which preferably provides reliable operation based on moisture content despite application of fertilizers, pesticides, herbicides and other chemical treatments which may be routinely applied to the soil being irrigated.

BRIEF DESCRIPTION OF THE DRAWINGS

Preferred embodiments of the invention are described below with reference to the following accompanying drawings.

FIG. 6 is a block diagram of an irrigation controller according to one embodiment of the invention.

FIG. 8 is a flowchart of operating logic according to one embodiment of the invention.

DETAILED DESCRIPTION OF THE PREFERRED EMBODIMENTS

Figure 1:
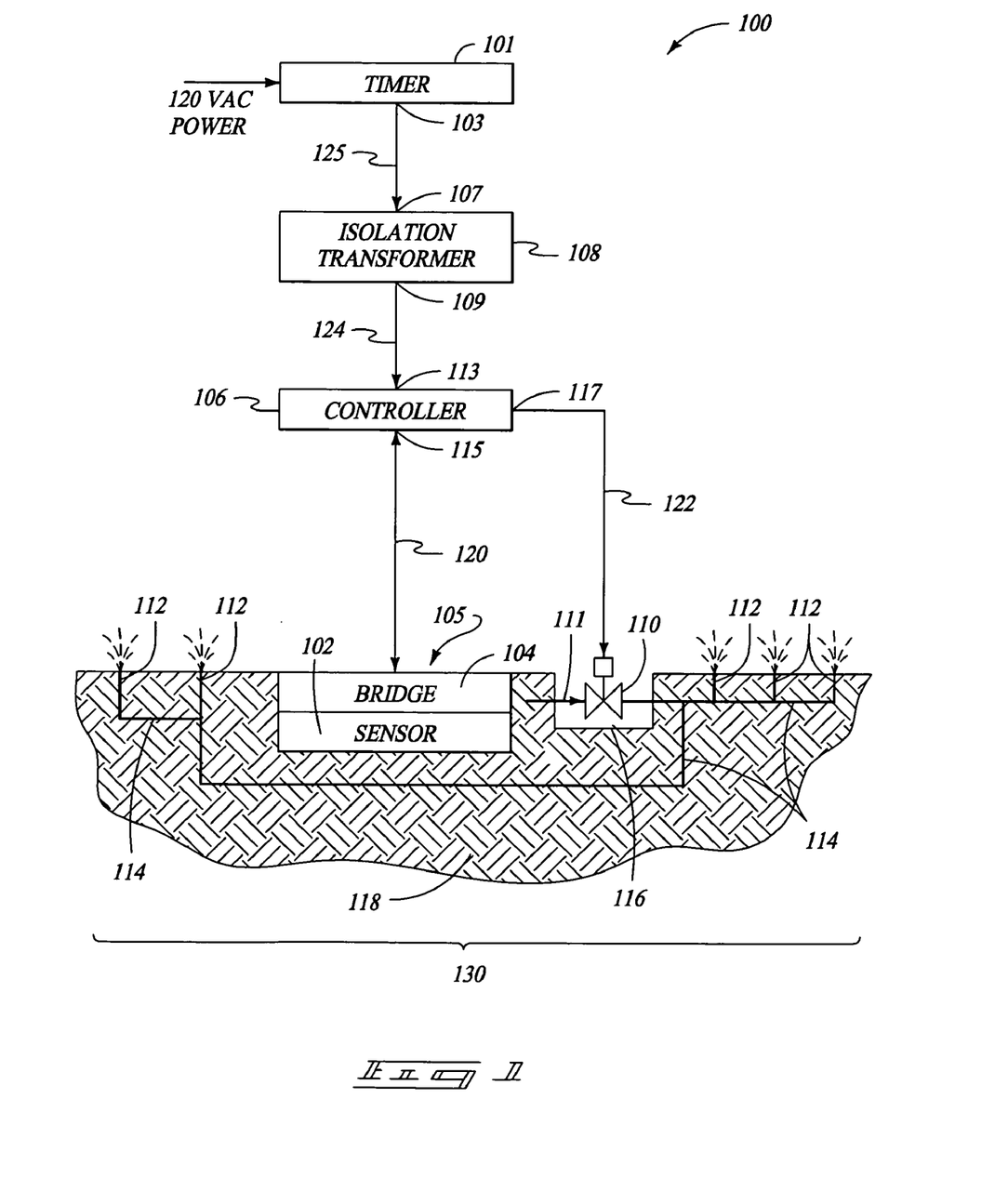
FIG. 1 is a diagram illustrating an irrigation control system according to one embodiment of the invention.

Irrigation System of FIG. 1

FIG. 1 is a block diagram of an irrigation system including in particular an irrigation control system 100 according to one embodiment of the invention. The control system 100 includes a timer or time clock 101 which preferably serves as both a clock and watering period timer. Timer 101 may be in the form of a solid-state programmable device, an electro-mechanical clock, or any other suitable construction. Clock 101 is advantageously coupled to a source of suitable operating power such as alternating current (A.C.) power, such as from the electrical mains of an electrical power supply system. Timer 101 has an output terminal or terminals 103 from which a timer control signal is conducted. The voltage output from terminal 103 is preferably reduced from the mains voltage power input to the timer. This is done for safety and efficiency considerations, such as by using a nominal 24 volt A.C. output at terminal 103.

Timer 101 serves to control the basic available watering times and available watering periods, alternatively called operating windows, during which irrigation system 100 may operate. According to the invention, the timer operating windows are subject to additional control due to sensed ground moisture as explained further below. For example, timer 101 may be programmed to provide one watering period per day having a watering period duration of twenty minutes. A multitude of other watering programs are possible. If the ground moisture sensor indicates that watering is desired, then watering will occur according to the timed control provided by timer 101 during this timer operating period window or similar available watering periods.

The control system 100 also preferably includes an isolation transformer 108. According to the embodiment shown, the output timer signal from terminal or terminals 103 of timer 101 is connected to the primary terminal or terminals 107 of an isolation transformer 108 using a timer signal conductor(s) or other connection 125.

Isolation transformer 108 typically will have a transformer ratio which is approximately 1:1, although other ratios may be suitable. The isolation transformer output from the secondary winding of the transformer is output via terminal(s) 109 and provides a transformer output signal which is communicated via conductor(s) or connection 124 to a controller 106.

Transformer 108 serves to help electrically isolate timer 101 from other components within system 100. Timer 101 and transformer 108 cooperate such that electrical power is provided at connection 124 at the programmed watering times and for the programmed duration of the watering periods established by timer 101. At other times electrical power is advantageously not present at connection 124. Isolation transformer 108 also helps by reducing or eliminating stray currents which may derive from electrically operated irrigation valves, such as valve 110, which typically have current losses into the ground.

System 100 also preferably includes controller 106. Controller 106 may be selected from a range of commercially available controllers now known or hereafter developed. Controller 106 has timer input terminal(s) 113 which is or are coupled to and advantageously receives electrical power from conductor 124 which communicates the isolation transformer output signal. This provides the basic operational timing regime defined by timer 101 to controller 106 as explained more fully elsewhere herein.

Controller 106 is also advantageously provided with connection terminals 115. Terminals 115 are coupled to an in-ground or ground unit 105 by way of connecting cable 120. Cable 120 is typically a three conductor cable and serves to communicate operational power from controller 106 to an ancillary circuit which advantageously includes a combined exciter and sensor indicator unit 104. The exciter and detector unit 104 is connected in close physical proximity to sensor 102. The exciter and detector unit 104 provides an excitation signal to sensor 102. It also detects or interprets the response of the sensor to the excitation signal and produces a detector signal which is a moisture indication signal. Additionally, other electrical signals (described hereafter) between the exciter and detector circuit 104 and controller 106 may be communicated using cable 120.

FIG. 1 shows that system 100 also includes ground moisture sensor 102. A preferred construction for sensor 102 is described in detail below. The preferred sensor 102 is used with the ancillary circuit 104.

Sensor 102 is preferably used with ancillary circuit 104 in a manner which places these components in close proximity and under similar conditions. This may be done such as by physically coupling ancillary circuit 104 to sensor 102. Spacing of these units within less than 1 foot is preferred for reliable results, and is more preferably arranged to be 0–3 inches, even more preferably less than about 1 inch. In a preferred embodiment, ancillary circuit 104 and sensor 102 are each enclosed and the enclosures are directly coupled together such that a singular physical unit is formed. The ancillary circuit is preferably enclosed or embedded in a moisture resistant material, such as a plastic. The sensor is provided with a water-permeable shell.

Sensor 102 is embedded in the earth 118 in order to provide sensing of the actual ground conditions for the zone or zones being irrigated. Where the system is used to irrigate lawn grass, this is preferably done 0–6 inches from the surface of the ground; more preferably less than 3 inches from the surface of the ground. Other types of plants may be best irrigated with sensor ground depth suggested by their root system depth.

The preferred ancillary circuit and sensor form a ground unit which may be placed directly in the earth. Alternatively, it may be mounted under a moisture resistant cover or substantially within an enclosure (neither illustrated) to reduce effects associated with surface water from rain or watering. Sensor 102 will be maintained in complete or substantial contact with the ambient soil if such a housing or enclosure is provided. The ancillary circuit need not be in ground contact, but can be if both are coupled together. A variety of suitable covers or enclosures may be suitable or desirable. The installation location for the ground unit should primarily consider and be indicative of actual ground moisture content for the zone being controlled.

Other manners and forms for mounting, coupling or, associating ancillary unit 104 and sensor 102 are possible, but may not provide the same degree of accuracy as conjoined mounting within a single subterranean location using a moisture resistant cover or enclosure for the circuitry and a moisture permeable sensor as described further herein.

System 100 also includes an irrigation valve 110. Valve 110 is preferably an electrically actuated valve. Alternatively, the value may be actuated in a different manner but be electrically activated using an electrical activation signal which controls another type of actuator. As shown, valve 110 is coupled to the controller 106 by way of control cable 122. Cable 122 connects between the controller valve activation output terminal 117 and the activation terminal on the valve (not specifically illustrated). Valve 110 is advantageously located in a utility box or cavity 116 within the earth 118 of irrigation zone 130. In an alternative embodiment, valve 110 may be located remotely from irrigation zone 130. Valve 110 is also coupled to a source of irrigation water 111 which is of conventional construction.

System 100 may further include a plurality of irrigation or sprinkler heads 112. Sprinkler heads 112 are coupled to the hydraulic output of valve 110 by way of piping 114 to allow irrigation fluid to be supplied to the sprinkler heads.

Under typical operation, system 100 performs as follows. Timer 101 indicates when a programmed watering start time has arrived. If so, the timer energizes or otherwise activates controller 106 for the duration of the associated programmed watering period by way of connection 125 via isolation transformer 108 and connection 124. Controller 106 provides electrical power for a relatively short sensor operating period to ancillary circuit 104 and sensor 102 by way of cable 120.

The sensor operating period may be divided into a warm-up period and a sensing period. During the warm-up period the controller 106 ignores any signals which it might receive from ancillary circuit 104. This is done to allow the sensor operation to stabilize after energizing. During the subsequent sensing period, the measured moisture level is sensed and used by the controller.

In a preferred embodiment, the sensor operating period is about thirty seconds. The warm-up period is about the first seventeen seconds and the sensing period is the remainder. Other total sensor operating periods, including sensing periods and warm-up periods, are possible.

Sensor 102 is embedded in earth 118 at a sensing location which is preferably near, and more preferably within, irrigation zone 130. Placement of sensor 102 in the area of the irrigation zone is advantageous to improve the indication of ambient ground moisture as affected by any watering performed by sprinklers 112. In the preferred sensors shown, the sensor provides a linear or non-linear electrical capacitance function a which is an indication corresponding to or otherwise is a mathematical function of the ground moisture content. Ancillary circuit 104 produces an electrical voltage as a moisture indicating signal in correspondence to, or as a function of, the electrical capacitance of sensor 102. This moisture signal from ancillary circuit 104 is provided to controller 106 by way of cable 120. This is advantageously done for the duration of the sensor operating period in the embodiment described and shown.

After the warm-up period has elapsed and the sensing period starts, controller 106 compares the moisture signal from the ancillary circuit 104 with a user-selectable or adjustable moisture threshold or set point. Assuming that the ground moisture is less than the set point, controller 106 interprets this condition as an indication that irrigation zone 130 is in need of watering. Controller 106 then opens valve 110 by way of a valve activation signal conducted by control cable 122. Accordingly, irrigation water flows from its source 111 through valve 110 and out to sprinklers 112 by way of the piping 114. This will occur for the remainder of the watering period established by timer 101.

It is noted that the ancillary circuit 104 and the sensor 102 are only active for a relatively short time during the sensor operating period at the initial portion of the watering period set by timer 101. In B this way, increasing ground moisture due to spray from the sprinklers 112 within the irrigation zone 130 does not influence controller 106 until the next watering cycle when a new comparison with the set point is made. In the preferred configuration shown, ground moisture sensor 102 and ancillary circuit 104 are used to determine an initial condition which controls the opening of irrigation valve 110. However, they do not affect closing the irrigation valve 110. Irrigation valve 110 is preferably controlled to close and end operation at the expiration of a preset watering time period, such as determined by timer 101.

Figure 2:
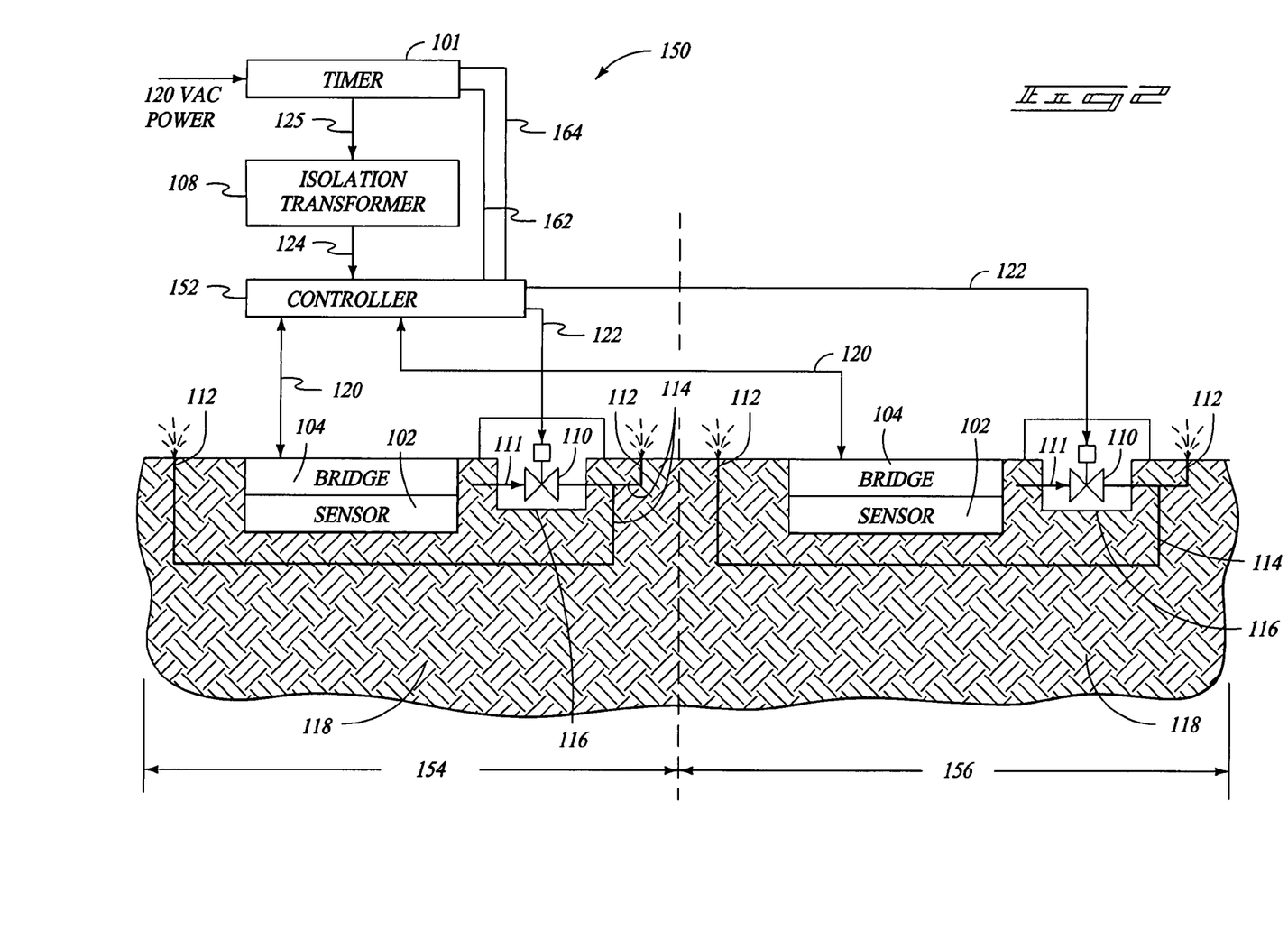
FIG. 2 is a diagram of an irrigation control system according to another embodiment of the invention.

Embodiment of FIG. 2

FIG. 2 is a block diagram of an irrigation control system 150 according to another embodiment of the invention. Irrigation system 150 includes a timer 101, an isolation transformer 108, and connections 124 and 125 operating similar to as described above for the embodiment of FIG. 1. However, connection 125 is preferably connected to the master valve control terminal of timer 101 and remains on during the entire watering cycle covering all zones.

Further included in system 150 is a controller 152 coupled to the connection 124 and receiving electrical power therefrom, as controlled by the master valve output signal of timer 101. Controller 152 is similar in operation to controller 106 described above. Controller 152 has multi-channel capability to independently sense and control two separate irrigation zones 154 and 156. This multi-zone capability is accommodated by zone output terminals which are separately communicated by conductors 162 and 164 to individual zone control input terminals on controller 152. The master valve signal is used to provide basic operating current via conductors 125, isolation transformer 108 and conductor 124. The zone control signals communicated by conductors 162 and 164 are received within controller 152 using an optical isolator, such as an optical triac (as described below). This construction helps achieve isolation from the electrical ground currents mentioned above or other spurious currents which may affect operation or cause malfunction.

Timer 101 may be programmed to independently control watering times and/or watering periods or sessions for irrigation zones and 156. In alternative embodiments, three or more channels and zones may also be provided in a variety of analogous multichannel and multi-zone systems.

Each of the zones 154 and 156 separately includes an ancillary circuit 104 and a sensor 102. The zones also each have a zone control valve 110. One or a plurality of sprinkler heads 112 are coupled to the hydraulic output of valves 110 by way of piping 114. Each of the valves 110 are also coupled to a source of irrigation water 111. These elements 102, 104, 110, 112 and 114 function substantially as described above for the first embodiment. System 150 also includes ground unit cables 120 and valve control cables 122 associated with each of the zones 154 and 156.

Typical operation of system 150 is as follows, explained first in connection with zone 154. Timer 101 provides basic electrical operating power to the controller 152 via isolation transformer 108 for the duration of the operating cycle. Upon initiation of operation of zone 154, controller 152 energizes the ancillary circuit 104 and sensor 102 within zone 154, ignoring the moisture signals during the warm-up period. Upon expiration of the warm-up period, the sensing period begins and controller 152 compares the moisture signal from circuit 104 of zone 154 with its respective user adjustable threshold which is set by a potentiometer or other suitable electrical device (not shown). Zones 154 and 156 preferably have separate and independently adjustable set points. This allows the particulars of the environmental conditions of the first zone 154 ground unit to be independently compensated by adjustment from the controller.

Depending on the sensed ground moisture and threshold setting, controller 152 then opens valve 110 associated with zone 154 for the duration of the watering period, or leaves that particular valve 110 closed for that period. This is advantageously done as a function of the comparison between the moisture signal and the moisture control threshold or set point.

At the end of the programmed watering period for first zone 154, the timer 101 shuts down the first zone timer signal communicated by conductors 162. Next, timer 101 energizes the second zone channel using conductors 164. Operation of second zone 156 then proceeds in the same manner as described above for first zone 154, during the programmed watering period for the second zone 156.

The timer 101 now waits until the next programmed watering time occurs and the cycle described above generally repeats. Other operational scenarios are also possible using this system and similar systems according to certain embodiments of the invention.

A distinction between controller 106 of FIG. 1 and controller 152 of FIG. 2 is that controller 106 is intended to sense and control only a single irrigation zone 130. In comparison, controller 152 is intended for independent sensing and control of two or more zones, such as irrigation zones 154 and 156 shown. Other aspects of the controllers 106 and 152 may be similar. Alternatively, the controllers for each channel may be independent units, or separate modules connected upon a base unit having power supply and other shared components.

Figure 3:
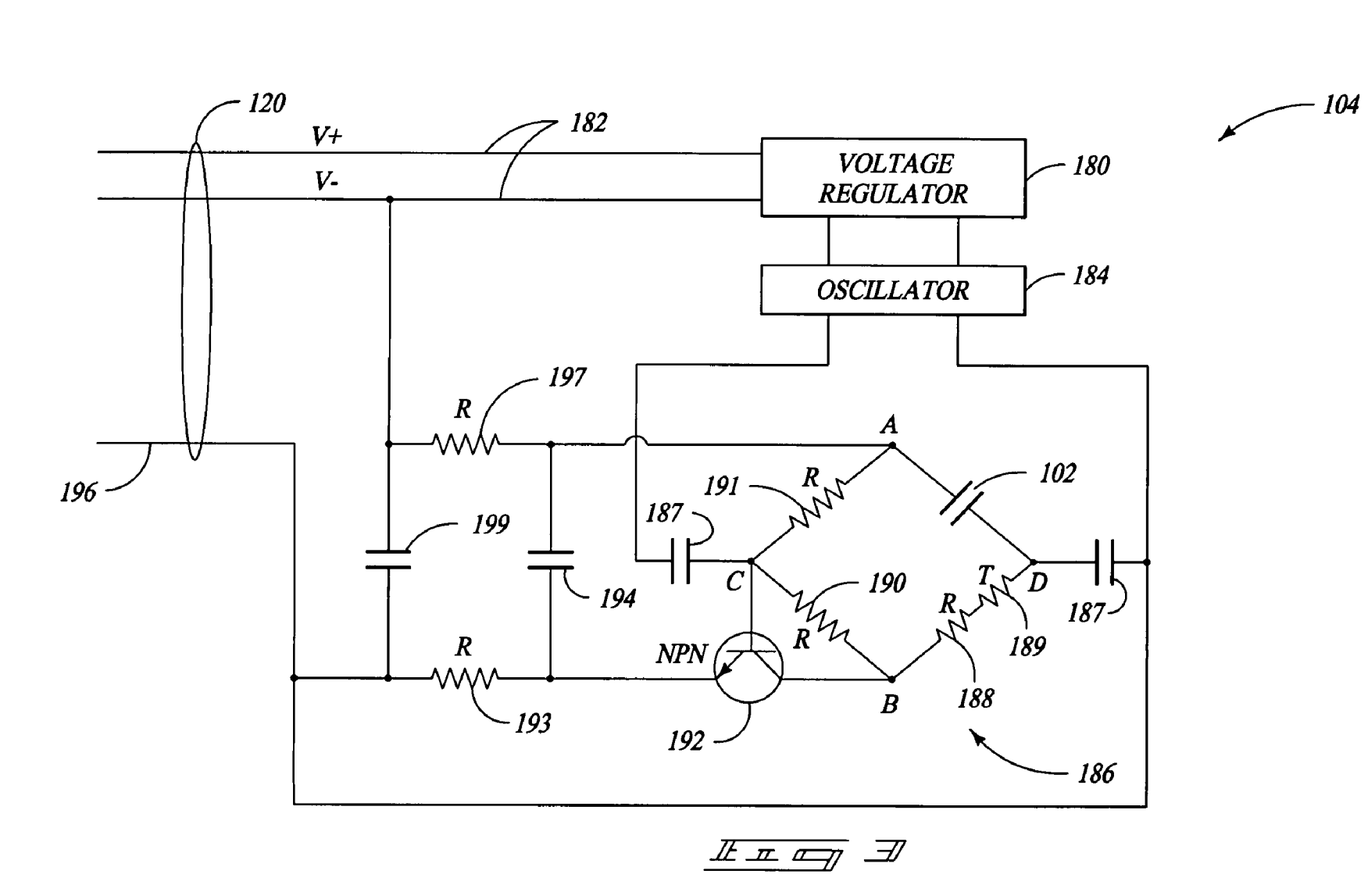
FIG. 3 is a combined block diagram and electrical schematic diagram of a subsystem according to one embodiment of the invention which includes an excitation circuit, sensor and sensor indication circuit.

Sensor Ancillary Circuit of FIG. 3

FIG. 3 is a combined block diagram and electrical schematic diagram of a preferred sensor ancillary circuit 104 in accordance with one embodiment of the invention. Sensor ancillary circuit 104 is connected to receive direct current from conductors 182 which power the ancillary circuit and associated sensor. This power can be supplied by the controller as shown herein or it can be from an independent power supply (not shown) separate from the controller or timer. The power supplied to the ancillary circuit 104 is preferably isolated so as to reduce or substantially eliminate any extraneous or stray currents that might otherwise come from the ground or other sources.

The ancillary circuit is also connected to the controller by moisture signal conductor 196 which serves to communicate a moisture indicating signal produced by circuit 104 and related sensor 102. Conductors 182 and 196 are conductors of connection cable 120 as shown in FIG. 1 or 2.

The direct current or other suitable electrical power supplied to sensor ancillary circuit 104 is preferably first coupled to a voltage regulator 180 to provide regulated direct current output therefrom. The is output from voltage regulator 180 is used to power an oscillator 184. Voltage regulator 180 and oscillator 184 can be according to a variety of conventional designs. In the circuit shown in FIG. 3 the output voltage from regulator 180 is about 5–10 volts, preferably about 7 volts, although other outputs may be suitable.

The current supplied by voltage regulator 180 is directed to oscillator 184 which is electrically coupled to the voltage regulator 180 and powered thereby. Oscillator 184 can be made using a variety of conventional designs. As shown, oscillator 184 is constructed to produce an alternating current output having a frequency in the range of approximately 10 kHz to 250 kHz. More preferably, the frequency range is in the range of 50 kHz to 150 kHz. The particular frequency will vary dependent upon particular values of the circuit; however, a frequency in the range of about 80 kHz to 150 kHz is believed to be preferred for minimizing the effects caused by common variations in soil chemistry, such to as variations in the content of various salts in the soil. The output of oscillator 184 is advantageously a square wave alternating voltage.

The voltage regulator 180 and oscillator 184 form key components of an exciter or excitation circuit which is used to apply a stimulating excitation signal to the capacitive sensor 102. Other portions of circuitry 104 are also interposed between the oscillator and sensor 102 and are used to affect the applied excitation signal to sensor 102 and are described below.

FIG. 3 also shows a capacitive or capacitor bridge circuit 186. The output from oscillator 184 is coupled to the bridge circuit at nodes C and D. This is preferably done using coupling capacitors 187. The bridge coupling capacitors 187 are typically of the same capacitance value. Such coupling capacitors are selected to have capacitance values which pass the desired excitation frequency and filter other undesired frequencies that may arise in the circuit due to a variety of causes.

Capacitor bridge 186 includes sensor 102 as a bridge element for one leg of the bridge. As shown, the sensor is the bridge element between nodes A and D. The sensor develops reactive capacitance to the input alternating current or other voltage varying stimulation or excitation signal used to drive the bridge. Depending on the moisture sensed by sensor 102, the reactive capacitance and equivalent or effective resistance varies and the bridge will develop different voltages between nodes A and B. This voltage differential between nodes A and B is used to indicate moisture.

The capacitor bridge arrangement 186 is configured to be coupled to sensor 102 by connection at nodes A and D. This is preferably by direct wiring, or alternatively, by detachable connection (not shown).

Capacitor bridge arrangement 186 also includes resistors 188, 190 and 191 which act as resistance elements in the electrical bridge between nodes D and B, B and C, and C and A, respectively. Depending on the effective resistance of the capacitive sensor 102, the bridge resistors are selected to have values which advantageously provide a zero volt moisture signal when the sensor is in dry soil and about a 2 volt moisture signal when the ground and/or moisture permeable sensor is saturated with moisture.

In some preferred forms of the invention, the bridge circuit 186 also includes a temperature compensating element or elements, such as a thermistor 189. As shown, the temperature compensating element of the bridge circuit is connected between nodes B and D in series with resistor 188. The resistance of thermistor 189 varies with temperature experienced by the ancillary circuit to significantly improve the reliability of the moisture measurement or other moisture indication provided by moisture signal line 196. The thermistor is also closely indicative of the temperature at sensor 102 when the ancillary circuit and sensor are closely positioned, or more preferably coupled together.

Further included in the preferred sensor circuit 104 is a rectifier or rectification stage which is principally provided in the form of an NPN transistor 192 and rectifier filter capacitor 194. The base of transistor 192 is connected to node C which is operating at an alternating or varying voltage under the influence of oscillator 184. The collector of transistor 192 is connected to node B. The emitter of transistor 192 is connected to a node between one electrode of rectifier filter capacitor 194 and to a first side of resistor 193. The action of the rectifier helps transform the voltage at the other or second side of resistor 193 into a fluctuating direct current signal indicative of moisture level sensed by sensor 102.

The output moisture signal 196 is further smoothed by impeding it through resistor 197 in electrical proximity between capacitors 194 and line filter capacitor 199. This construction also serves to help isolate the capacitive bridge 186 and sensor from the output signal line 196 to reduce any effects from currents applied or induced as the signal line is connected back to controller 106. Controller 106 thus receives the communicated moisture output signal from output 196. The indicated filtering and isolation features are desirable to minimize any distortion of the signal which might occur due to currents applied to the signal line 196 by the controller or from other causes.

FIG. 3 shows that the ancillary circuit 104 includes ground or communications signal line filter capacitor 199. This is particularly desirable to help filter out 60 Hz or other undesirable frequencies that may arise on the V− or negative of power supply conductors 182. Reduction or elimination of these spurious, undesirable frequencies is significant in helping the relatively sensitive sensor and related detection circuit described above to be isolated from currents that may cause the sensed moisture signal to be variable and hence unreliable.

In typical operation, circuit 104 performs as follows. Voltage regulator 180 reduces and stabilizes the voltage of the incoming D.C. power at connection 182 to a level usable by the balance of the circuitry of the circuit 104. The voltage regulator 180 may comprise a solid-state, constant voltage regulator device. Other types of voltage regulators for use as regulator 180 are possible. Power from voltage regulator 180 is routed to the oscillator 184. Oscillator 184 may comprise a solid-state oscillator device, a crystal-controller oscillator, or a digital logic-gate-based oscillator. Other types of oscillators for use as oscillator 184 are possible. In a preferred embodiment, oscillator 184 provides an electrical output signal having a frequency of about 110–125 kHz. Other frequencies associated with other embodiments are possible.

The oscillator 184 has an electrical output signal which serves to energize or excite the bridge 186 and the connected sensor 102. The sensor 102 is configured and coupled to provide an electrical capacitance between nodes A and D of the capacitor bridge arrangement 186. The value of the electrical capacitance provided by the sensor 102 varies in correspondence to the ambient moisture concentration to which the sensor 102 is subjected.

In one preferred embodiment, the values of resistors 188, 190 and 191 are thirty-three hundred (3300 ohms), fifteen hundred (1500 ohms) and ten thousand ohms (10,000 ohms), respectively, and the thermistor 189 is an approximately five hundred ohm (500 ohm) device. Other values for elements 188, 189, 190 and 191 are possible. In any case, the values of the resistors 188, 190 and 191, and the thermistor 189, are selected such that about a zero volt A.C. signal appears across nodes A and B of the capacitor bridge arrangement 186 when the sensor 102 is subjected to dry conditions. This zero volt condition is commonly referred to as a "balanced bridge" condition. The thermistor 189 provides for cancellation of temperature drift effects which may occur within the capacitor bridge arrangement 186 and/or the sensor 102 due to fluctuations in ambient temperature to which the ground unit is subjected.

When the moisture concentration about the sensor 102 increases, the corresponding capacitance of the sensor 102 increases as well. This increase in electrical capacitance as seen between nodes A and D of the capacitor bridge arrangement 186 results in an "unbalanced bridge" condition, due to the associated change in capacitive reactance. This unbalanced bridge condition results in the appearance of a non-zero A.C. signal between nodes A and B of the capacitor bridge arrangement 186, having a voltage magnitude which increases in correspondence to increasing moisture concentration sensed by sensor 102.

Rectifier 192, coupled to nodes B and C of the capacitor bridge arrangement 186, partially rectifies the A.C. signal appearing across the bridge as a result of the unbalanced bridge condition. The voltage at node A of the bridge arrangement is pulled toward a negative V− voltage by the connection to V− through isolation resistor 197. The node A is also connected to rectifier filter capacitor 194 at the second electrode, opposite from the first electrode thereof which is connected to the emitter of rectifying transistor 192. The second side of resistor 197, opposite from node A, is connected to line V− and to the second electrode of line isolation filter capacitor 199.

The output on moisture signal line 196 is routed to an external receiver, for example, controllers 106 or 152, by way of cables 120. The moisture signal 196 has a voltage level which corresponds with or otherwise indicates the moisture in or about sensor 102. This is indicative of the ground moisture in the ambient area near sensor 102. Filters 194 and 199 and resistors 197 and 193 also serve to help impedance match circuit 104 with the external receiver of this signal at controllers 106 or 152.

Circuit 104 provides a moisture signal 196 having a range of magnitudes varying from about zero to two volts D.C. Other ranges for the moisture signal 196 corresponding to or used in other embodiments of bridge circuit 104 are possible. In a preferred form of the invention, the circuitry 104 is potted or otherwise encapsulated in suitable plastic so as to form a water impermeable or water resistant housing.

Preferred Sensor Constructions

Figure 4:
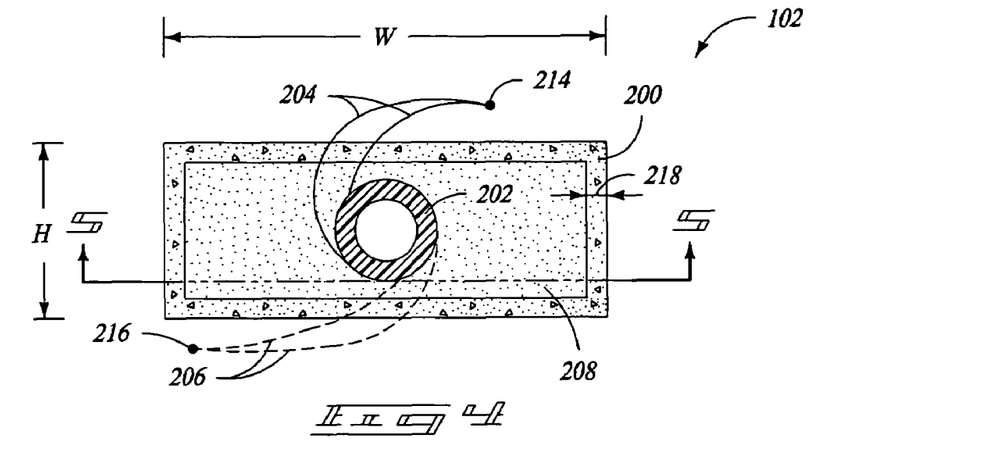
FIG. 4 is a cross-sectional view of a ground moisture sensor according to one embodiment of the invention.
Figure 5:
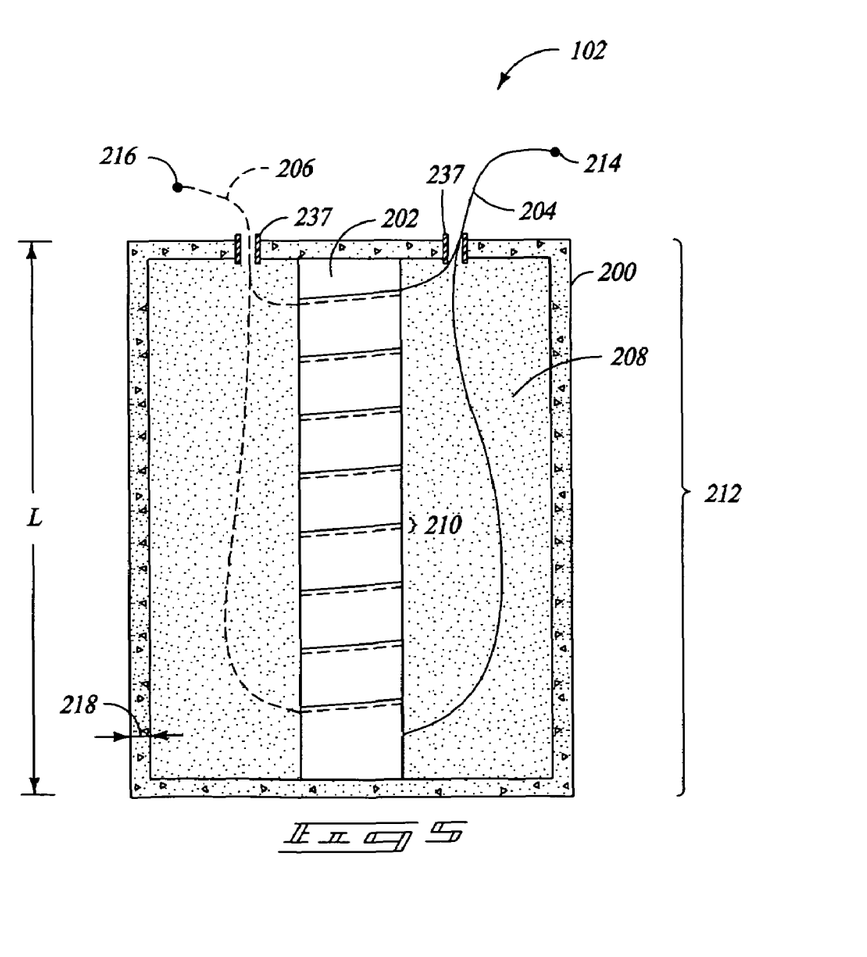
FIG. 5 is a longitudinal sectional view of the ground moisture sensor of FIG. 4 taken along line 5—5 of FIG. 4.

FIGS. 4 and 5 are cross-sectional and longitudinal sectional views of a preferred sensor 102 according to one embodiment of the invention. Sensor 102 includes an exterior shell 200 having a wall thickness 218. The shell 200 is advantageously formed of a water permeable material. In one preferred embodiment, shell 200 comprises concrete. In another preferred embodiment, shell 200 comprises terra cotta. Other water permeable materials for shell 200 may be suitable for use in the invention. Other less preferred, possible forms of the invention may include relatively low permeable materials formed into water permeable structures, such as open cell structures or those with many capillaries or passages through which water may migrate.

As shown, shell 200 has a length L, a width W and height H. In one preferred embodiment formed of concrete, the dimensions of L, W and H are about 3 inches, 1.5 inches and 1 inch, respectively. Other dimensions for L, W and H associated with other embodiments of shell 200 are possible.

Sensor 102 also preferably includes a conductor support which is located within shell 200. The conductor support 202 is advantageously in a central location within shell 200. Support 202 is preferably made from an electrically non-conductive material. It has been found suitable if also selected to be of relatively low water permeability. One suitable material is polyvinyl chloride (PVC), which has a relatively high dielectric strength. In a preferred embodiment, support 202 comprises PVC pipe. Other materials, shapes and sizes for support 202 is are possible.

Sensor 102 also includes at least one conductor, and more preferably a pair of conductors 204 and 206 which are advantageously insulated. Conductors 204 and 206 serve as opposing electrodes of the capacitive sensor. The conductors are preferably arranged upon the support in a manner which produces favorable results. In the construction shown, the conductors are wound about support 202 in a parallel helical arrangement with approximately equal spacing between the electrodes. The helical pattern is also preferably arranged so as to provide approximately equal helix spacings or advance pitch between adjacent turns of the pair of parallel helical spirals thus formed. Such an arrangement has been found helpful in achieving a nearly linear response capability for the sensor. In particular, this arrangement coupled with a uniform material therebetween provides a capacitance function which is increasingly linear as moisture increases. This arrangement thus increases accuracy in the normal moisture range being sought.

The complementary conductors 204 and 206 forming the electrodes are advantageously spaced apart in a complementary relationship. The complementarity can favorably be accomplished with an approximately equal complementary spacing distance when using a pair of uniformly sized electrical wires as the electrodes.

The space between the wires is advantageously filled with a sufficiently uniform material so that the capacitance does not vary appreciably between and along the wires. This is helpful in maintaining the dielectric constant relatively consistent between the two electrodes of the capacitor formed thereby.

In a preferred embodiment, conductors 204 and 206 comprise twenty-eight gauge, double enamel coated conductors, making about thirty complete turns about support 202, with a separation distance 210 of about 0.1–0.2 inch (~2–5 millimeters). Other sizes, spacings and configurations for conductors 204 and 206 are possible consistent with the teachings of this invention. In the sensor construction described herein, an intact set of electrode conductors should not have conductive leakage between the electrodes. Leakage should be small enough to demonstrate not less than 20 megohms of resistance between the capacitive sensor electrodes when wet.

Each of the conductors 204 and 206 has opposing ends which are preferably connected so as to form electrical nodes 214 and 216, respectively. Such nodes are preferably connection points for the sensor into the circuit as described above (nodes A and D of FIG. 3). In this way, each of the conductors 204 and 206 forms a loop. The two loops are arranged in complementary relationship, such as the parallel helical spirals described.

Note that conductors 204 and 206 remain spaced and conductively isolated from each other within the configuration of sensor 102. This is achieved by both the spacing and electrical insulation about each wire and is significant in producing a sensor which is primarily reflective of capacitance changes resulting from moisture variations in the media interposed between the conductors and not electrical conduction between the loops. To a reduced degree the media about the conductors which is not interposed between the pair of electrodes may also affect the sensor capacitance behavior.

In a preferred embodiment, conductors 204 and 206 are routed through the shell using respective insulated sleeves or conduits 237. The conductors each extend from inside of shell 200 through small apertures in the shell at sleeves 237 and into the housing of the sensor ancillary circuit 104. These conduits serve to protect the typically fragile conductors 204 and 206 against cuts in their insulatory coatings. Such cuts or other damage may be detrimental to the overall performance of sensor 102.

Sensor 102 also preferably includes fill media 208. Fill 208 is present within the intervening space between conductors 204 and 206 and about the conductors external to the support 202. As shown, the media may fill the entire sensor shell interior cavity space between support and the inside surface of shell 200. Other fill constructions may alternatively be suitable, depending upon their particular features.

Fill 208 is capable of migrating water. The current preferred media provides a porous media structure. More preferably, the media can be a fill of suitable materials such as sand, finely crushed rock, glass particles and other materials which are granular or particulate and otherwise suitable for this sensor. The media performs by absorbing or adsorbing water and migrating it from the water permeable shell toward the support and electrodes. The moisture content variations provide a detectable or discernible effect on the capacitance demonstrated by the electrodes as excited and sensed by the capacitive bridge.

The preferred sand fill 208 also serves to maintain the positions of support 202, conductors 204 and 206, and shell 200 in a substantially fixed orientation and relationship to one another. This helps to provide repeatable results and thus allows a sensor design which achieves linear or near-linear response and maintains such response characteristics. Such also provides mechanical strength to the shell and entire structure of the sensor so that it can be planted into the ground in a relatively close position to the surface of the ground and survive typical service. Such service may be subjected to overburdens and loading from soil, traffic, vehicles, mowers, etc.

The material used as fill material 208 is preferably granular fill material of a proper size that allows moisture to migrate readily from the shell by substantial contact of fill material with the interior surface of the shell. The granular fill also is selected to have a grain size which provides sufficient voids between granules so as to provide a significant amount of voids. The voids must make up sufficient void volume so that when the sensor is dry the volume is filled mostly with air. When the sensor is exposed to wet conditions, then the voids fill with sufficient moisture so that the dielectric properties sensed by the electrodes change significantly and provide a demonstrated change in effective capacitance.

It is believed that the granules should have a grain size which is preferably in the range of about 0.01 inches in diameter to about 0.1 inches in diameter. This applies to a predominant percentage of the total mass of granules, for example approximately eighty percent (80%) of the mass should have grain sizes in this range. More preferably approximately ninety percent (90%) of the mass should have grain sizes in this range.

In one preferred form of the invention, fill 208 comprises silica sand having a medium grain size, such as in the range passed by a sieve size 16 and retained by sieve size 30. This results in sand granules or particles predominantly or generally having a grain size of about 0.02 to about 0.05 inches in diameter (~½–1 mm). Other types and sizes of fill media may be suitable depending on the particular design being used. The size, configuration, length of electrodes and shell may affect the particular granules which provide the best performance.

The preferred sensor parameters indicated above provide a sensor having electrical capacitance between nodes 214 and 216 in the range of about 100 picofarads when the sensor 102 is in very dry conditions; and about 1,000 picofarads when the sensor 102 is in very wet conditions. Other ranges of electrical capacitance associated with other sensor configurations will occur. Modification to circuit values may be needed if different ranges of sensed capacitance are produced in any particular sensor construction being used. Thus the sensor and excitation and detection circuitry are best designed and tested to achieve suitably linear results, or other compensation circuitry may be needed.

Operation of Sensor 102

In typical operation sensor 102 performs as follows. Sensor 102 is buried in direct contact with the earth. This may suitably be accomplished by burial entirely in the earth at a location within or near an irrigation zone to be sensed and controlled; for example, within earth 118 of irrigation zone area 130 as shown in FIG. 1. The sensor preferably has continuous contact between the outer surface of the shell 200 and the earth. Moisture in the ambient earth migrates through the water permeable shell 200 and into fill 208 of sensor 102. The migrated moisture affects the capacitance and reactive capacitance demonstrated between the electrodes due to the dielectric constant or permittivity properties of fill 208. This in turn indicates the moisture content or water concentration of the ambient earth. Thus, the electrical capacitance developed between the electrodes of sensor 102 is indicative of the moisture contained in the ambient earth. The moisture migrational responsive characteristics of the sensor may be varied if the application requires frequent watering sessions, thus needing greater moisture migration rates. The current sensor has been found suitable for lawn watering requirements.

Sensor 102 is coupled to a suitable ancillary circuit (for example, circuit 104) which provides an electrical stimulus in the form of a voltage varying, preferably alternating current excitation signal. The excitation signal is applied to the sensor at nodes 214 and 216. The electrical stimulus is affected by sensor 102 and provides a basis for detection. This is preferably done using a detection circuit which is external to the sensor but in very close proximity therewith to minimize additional capacitive effects associated with transmitting the sensor signals and detecting capacitance associated therewith.

The detection circuit derives a measurement of the electrical capacitance of the sensor 102 as it appears between the nodes 214 and 216 which is variable, preferably in a relatively linear manner, between soil moisture levels ranging between dry and wet soil conditions experienced at the installation site. It is noted that the sensor 102 of the preferred embodiment exhibits a substantially linear correspondence between the demonstrated electrical capacitance and the ambient moisture concentration of the surrounding soil. This substantially linear response is desirable, as it contributes favorably to simplifying the design of associated circuitry (for example, circuit 104 and a controller 106), advantageously used in conjunction with sensor 102.

Irrigation Controller of FIG. 6

Power Supply

FIG. 6 is a block diagram of an irrigation controller 106 in accordance with one embodiment of the invention. As shown, the controller 106 receives switched A.C. power from a timer 101 by way of connection 125, isolation transformer 108 and connection 124. The controller 106 includes a rectifier 250 coupled to the A.C. power provided at the connection 124. The controller 106 also includes a voltage regulator 252 coupled to the rectifier 250 output by electrical connection 251. The rectifier and voltage regulator form a D.C. power supply.

In one embodiment, regulator 252 comprises a solid-state, constant voltage regulator module which supplies about twenty-seven volts D.C. power between the first or positive output (+) node 254 and the second or ground (−) output node 256. Other constructions for providing the desired D.C. power supply are alternatively possible.

Moisture Signal Input Filter

Controller 106 also includes a moisture signal input filter 258. The input filter 258 is coupled to moisture signal conductor 196 provided by an external source (for example, circuit 104) by way of a cable 120. Filter 258 is configured to substantially attenuate any 60 Hz signal content which may be present in the moisture signal conductor 196. The output from filter 258 provides a filtered moisture sensor signal 264 at the remotely positioned controller, such as controllers 106, 152.

Moisture Adjustment Control

The controller 106 further includes a threshold adjustment assembly 260. The threshold assembly 260 is coupled to a direct arrest supply node, such as D.C. node 254, and at the opposite end to a ground node 256. Threshold assembly 260 derives a D.C. threshold set point output signal 266 in accordance with a user selectable adjustment set point. The resulting threshold signal 266 typically has a voltage within a to range similar to the variability range of moisture signal 196 produced by the ground-mounted sensor 102, such as described above. In one embodiment, the threshold assembly 260 comprises a potentiometer. Other forms of threshold assembly 260 are possible.

Moisture Comparison Result Signal

Controller 106 includes a comparator 268 coupled to the filtered moisture signal 264 and the threshold signal 266. The comparator 268 provides a result signal 270 in accordance with the comparison of the signals 264 and 266. In a preferred embodiment, comparator 268 comprises an operational amplifier. Other embodiments of comparator 268 are possible.

Coupled to the output of comparator 268 is a result signal filter 272. Filter 272 serves to remove or reduce voltage spikes from signal 270 as a result of rapid output signal switching of comparator 268. Filter 272 provides a filtered result signal 276.

Controller 106 may also advantageously include an LED indicator 274 coupled to the result signal 270 or other suitable connection. Indicator LED 274 provides a visual indication of the status of the result signal 270. This is typically constructed to have the LED on when moisture is high and watering is prevented.

Counter Sub-Circuitry

Controller 106 also includes a counter 280. In a preferred embodiment, counter 280 comprises a fourteen-bit ripple counter integrated circuit. Other forms for counter 280 may be suitable for use in the invention. Counter 280 provides a bridge enable signal 292, a valve enable signal 294, and a counter oscillator freeze signal 296.

Counter 280 is coupled with a counter oscillator 284 to provide a timing clock. Counter oscillator 284 is coupled to receive the oscillator freeze signal 296. Counter oscillator 284 provides a clock output signal 290 having a preferred frequency of about 60 Hz. In a preferred embodiment, oscillator 284 comprises an operational amplifier. Other forms for oscillator 284 are possible. The clock output signal 290 is coupled to a clock input of counter 280.

Optical Isolator Sub-Circuitry

Controller 106 also includes an optical isolation section 278. The optical section 278 is coupled to receive the filtered result signal 276 and the valve enable signal 294. The optical isolation section provides a valve trigger signal 298. In a preferred embodiment, the optical isolator 278 comprises an optically isolated triac. Other forms for optical isolator 278 are possible. Optical isolation is preferred to prevent undesired electrical signal feedback which may be picked up by cable 120.

Valve Activator

Controller 106 further preferably includes a valve activation switch which may be in the form of a triac switch circuit 283. Switch 283 is responsive to valve trigger signal 298 to control A.C. power delivered via the connection 124. This is most preferably done by switching the A.C. common side connected to the valve or multiple valves run in a group. The triac switch circuit 283 provides a valve activation signal 299.

Operation of Controller 106 of FIG. 6

Controller 106 also includes a sensor operation switch section 282 coupled to the D.C. power node 254 and to the bridge or sensor enable signal 292.

Typical operation of controller 106 is substantially as follows. It is assumed that power has been off and has just been restored at connection 124. This is typically in accordance with a watering time programmed at timer 101. Rectifier 250 and the voltage regulator 252 cooperate to provide D.C. electrical power to the balance of the circuitry of the controller 106 by way of the nodes 254 and 256. In response to the application of electrical power, counter 280 assumes a reset condition. As a result of this reset condition, the bridge or sensor enable signal 292, the valve enable signal 294, and the oscillator freeze signal 296 are all asserted to an OFF state by counter 280.

The OFF state of the oscillator freeze signal 296 results in the oscillator 284 assuming a run condition and generating 60 Hz or other suitable clock output signal 290. The 60 Hz clock signal 290 is input to the counter 280 and causes the counter 280 to begin a sequential count which is a timer.

At this point, the sensor operating period begins, as established by counter 280. In a preferred embodiment, the sensor operating period has a duration of about thirty seconds. The warm-up period is established as the first seventeen seconds of the thirty-second sensor operating period. The sensing period is the remainder. Other time periods associated with other embodiments of controller 106 are possible. Immediately after the counter begins, the bridge enable signal 292 is asserted ON by the counter 280, and will stay on for the duration of the sensor operating period. Switch 282 responds to the assertion of the bridge enable signal 292 by conducting D.C. electrical power from power supply node 254 to circuit 104 via conductor 182 of cable 120. Note that at this point, the valve enable signal 299 remains in an OFF or deactivated state.

Soon after the provision of power at connection terminal 182, a moisture signal 196 is developed by circuit 104 and communicated back to the controller at input filter 258 by way of cable 120. Filter 258 substantially attenuates any 60 Hz signal content from moisture signal 196.

The output voltage of moisture sensor filter 258 is the filtered moisture signal 264 which is compared with adjustable threshold signal 266 by comparator 268. If the filtered moisture signal 264 is of lesser voltage magnitude, then the result signal 270 is asserted to an ON state. If not, then the result signal 270 is left in an OFF condition. The result signal 270 is preferably filtered of voltage spikes by the comparator output filter 272 and is routed on as filtered result signal 276 to the optical isolation section 278.

Expiration of the warm-up period by counter 280 begins the sensing period. During the sensing period the valve enable signal 294 is asserted ON by counter 280. The output from optical isolation section 278 responds to the filtered result signal 276 and the valve enable signal 294. In the event that both of the signals 276 and 294 are ON, the to optical isolation section 278 will assert and latch the valve trigger signal 298 are in an OFF condition. If any one or both of the signals 276 and 294 are in an OFF state, then the optical isolation section 278 will latch the valve trigger signal 298 into an ON condition.

In response to the trigger signal 298, the valve switch 283 will latch into a conductive state if the valve trigger signal 298 is ON. This provides A.C. common power from connection 124 to activation signal which will activate the sprinkler valve(s). If the valve trigger signal is OFF, then the triac valve switch 283 will remain in a nonconductive state. In either case, the valve activation signal 299 is coupled to an external load, for example, an irrigation valve 110 by way of cable 120.

Expiration of the sensor operating period results in the bridge enable signal 292 and the valve enable signal 294 being asserted back to an OFF condition by counter 280. In so doing, the sensor operating switch 282 turns OFF. This ends power to the ground unit circuit and sensor. However, the valve activation signal 299 remains ON or OFF, as was determined during the sensing period, for the duration of the provision of power at the connection 124. This duration, as described above, is typically established by timer 101.

Finally, counter 280 asserts the freeze oscillator signal 296 in an ON condition. In response to the ON condition of signal 296, the oscillator 284 ceases operation and the associated clock output signal 290 effectively stops. As a result, the count sequence of the counter 280 remains static in this state and remains therein until counter 280 is reset, is such as by removal and subsequent restoration of power at connection 124. This typically occurs, for example, when the timer 101 discontinues the provision of power at the connection 125 at the end of one programmed watering period, and restores power upon the arrival of the next programmed water time.

Other embodiments of a controller are possible. For example, in an embodiment in accordance with the controller 152 described above, all of the elements described for the controller 106, plus additional (i.e., second irrigation zone) elements corresponding to the elements 258, 260, 268, 272, 274, 278, 282 and 283, and their respective input and output signals, would be present, functioning substantially as described above except as detailed below.

The system of FIG. 2 uses time zone control signals communicated via conductors 162 and 164 to initiate operation for each zone input at valve switch 283 and as a condition to sensor operation switch 282. They may involve another gate or a different switch having an additional input. The D.C. power supply providing power at node 254 may be operational in response to the master control valve of timer 101 via isolation transformer 108.

It is noteworthy that by resetting the controller of FIG. 6 for each zone in a sequential manner, a single controller may serve duty for multiple zones. Alternatively, each zone may have a separate controller the same as or similar to the construction shown in FIG. 6.

Figure 7:
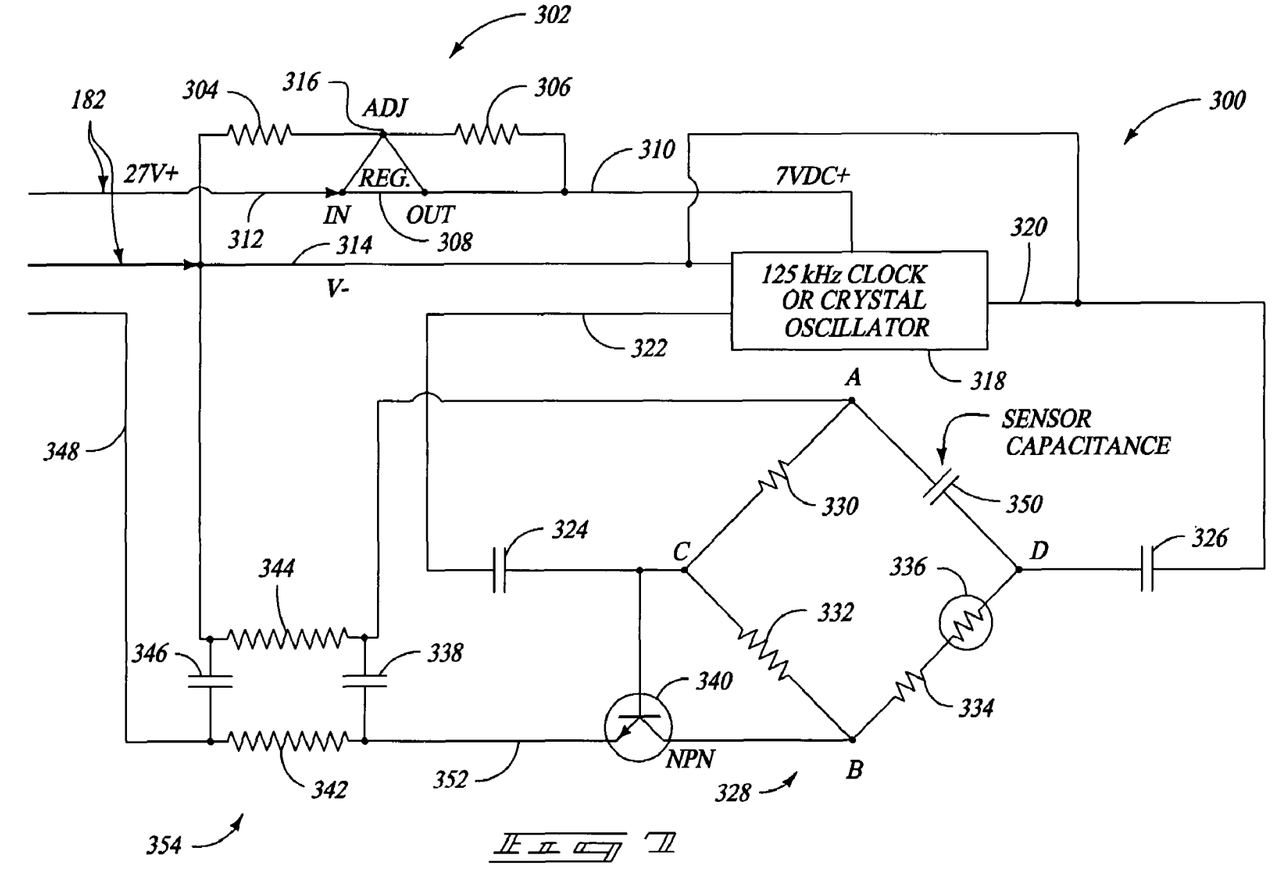
FIG. 7 is an electrical schematic diagram of a subsystem according to one embodiment of the invention including an excitation circuit, sensor and sensor indicating circuit.
Figure 13:
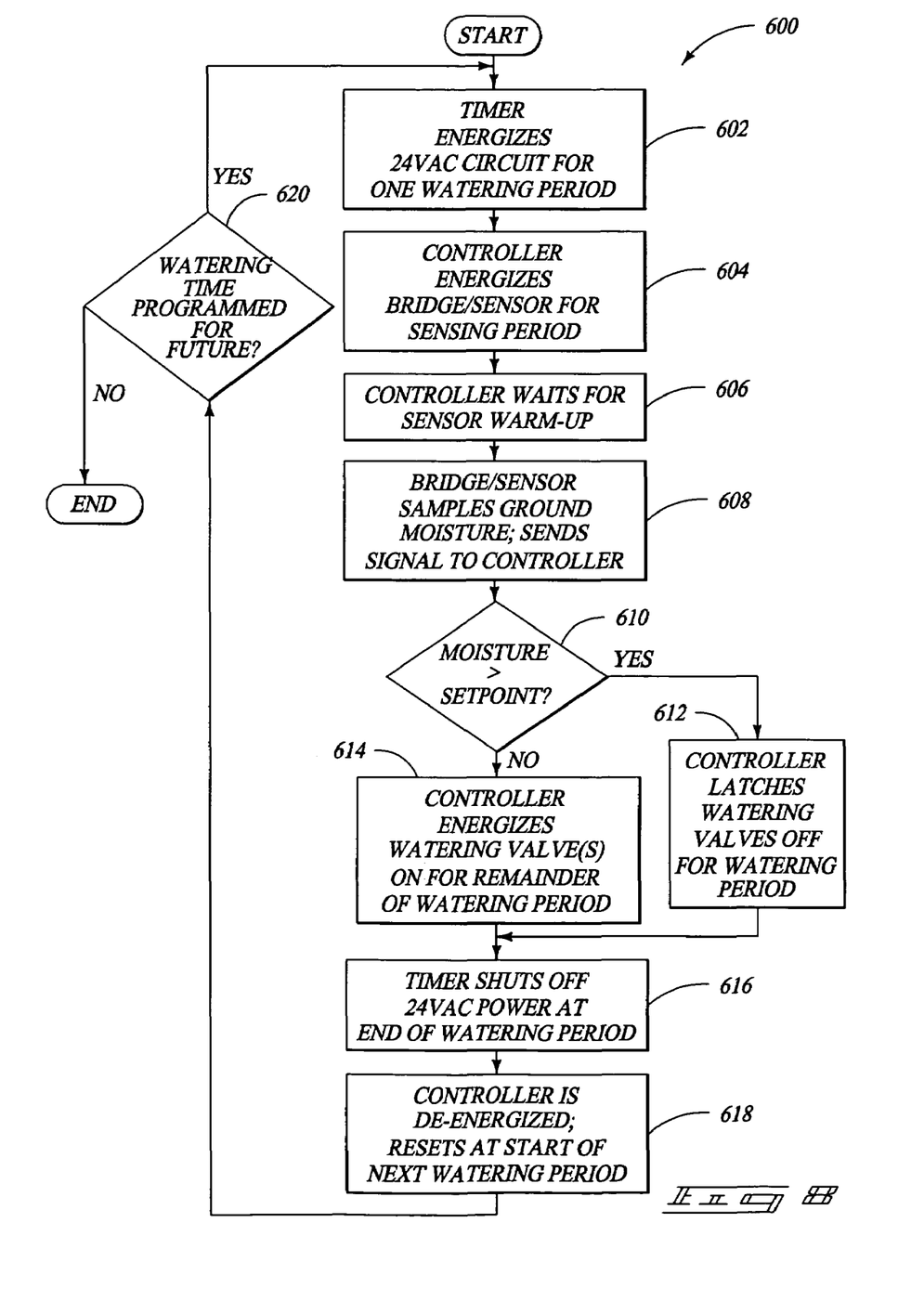

Sensor Ancillary Circuit of FIG. 7

FIG. 7 is an electrical schematic of a sensor circuit 300 according to another preferred embodiment of the invention. Reference is also made to Table 1, which provides component values for the various elements of circuit 300. Sensor circuit 300 performs substantially as described above for circuit 104. Circuit 300 includes voltage regulation sub-circuit 302. Regulation sub-circuit 302 includes a solid-state regulator 308, coupled to resistors 304 and 306. Resistors 304 and 306 are respectively connected to a ground line 314 and to an output voltage line 310. Regulator 308 is connected to an input D.C. voltage 312 and to the output voltage line 310. Resistors 304 and 306 form a voltage divider at node 316 which is input to regulator 308 to maintain a substantially constant seven volts D.C. on output line 310.

Bridge circuit 300 further includes an oscillator 318 which is coupled to and derives its operational power from voltage regulator output line 310 and ground line 314. Oscillator 318 includes output signal lines 320 and 322. Oscillator 318 provides a substantially square wave output signal having a frequency of about 125 kHz and an amplitude of about 5–7 volts peak-to-peak. The signal output is coupled to a capacitor bridge arrangement 328 at nodes C and D, by way of respective coupling capacitors 324 and 326. The coupling capacitors 324 and 326 serve to provide an A.C. signal coupling and at the desired oscillator frequency and diminishment of other frequencies.

Sensor circuit 300 further includes the capacitor bridge arrangement 328 introduced above. The capacitor bridge arrangement 328 includes a resistor 330 between nodes A and C; a resistor 332 between nodes B and C; a series arrangement of a resistor 334 and a thermistor 336 between nodes B and D. The capacitor bridge also includes an externally located capacitance 350 (for example, ground moisture sensor 102) between nodes A and D. Resistors 330, 332 and 334, and thermistor 336 serve to provide a balanced bridge condition between nodes A and B when the external capacitance is subjected to dry conditions. Furthermore, thermistor 336 provides temperature drift-compensation to the capacitor bridge arrangement 328.

The bridge circuit further includes an NPN transistor 340 is serving as a rectifier. Transistor 340 has a base connected to node C and a collector connected to node B of the capacitor bridge arrangement 328. The emitter of rectifying transistor 340 is connected at rectifier output line 352.

Bridge circuit 300 also preferably includes a filter 354. Filter includes a capacitor 338; a resistor 342, a resistor 344, and a capacitor 346. Filter 354 is coupled to node A of the capacitor bridge arrangement 328 and to rectifier output line 352 of transistor 340. The resistors 342 and 344, and capacitors 338 and 346 serve to filter any 60 Hz signal content which may be present. The filter also provides an output signal on a moisture signal line 348, derived from the electrical potential between collector line 352 and node A.

TABLE 1

Bridge Circuit 300 Preferred Component Values

| Element | Value or Part No. |
| --- | --- |
| 304 | 1K Ohm Resistor |
| 306 | 220 Ohm Resistor |
| 308 | LM317 Voltage Regulator I.C. |
| 324 | 0.1 F Capacitor |
| 326 | 0.1 F Capacitor |
| 330 | 10K Ohm Resistor |
| 332 | 1500 Ohm Resistor |
| 334 | 330 Ohm Resistor |
| 336 | 500 Ohm Thermistor |
| 338 | 0.1 F Capacitor |
| 340 | NPN Transistor |
| 342 | 100K Ohm Resistor |
| 344 | 47K Ohm Resistor |
| 346 | 2.2 F Capacitor |

Further Explanations Concerning Operation

FIG. 8 is a flowchart of operating logic 600 according to one preferred embodiment of the invention. Reference is also made to FIG. 1. The operating logic 600 begins with step 602, in which, for purposes of example, it is assumed that a timer 101 has reached a programmed watering time and energizes a 24 VAC output circuit, ultimately providing power to a controller 106, for the duration of a programmed watering period.

In step 604, the controller 106 responds to the provision of 24 VAC power by transitioning through a reset condition. Then, the controller 106 begins an internally established sensing time period, during which electrical power is provided to ancillary circuit 104 and a sensor 102 arrangement by way of a corresponding cable 120.

In step 606, the controller 106 waits out the initial portion (i.e., warm-up period) of the sensing period begun in step 604, and is ignores any ground moisture signals which may be received from the bridge 104 during the warm-up period.

In step 608, the ancillary circuit 104, in conjunction with the sensor 102, sends a ground moisture signal to the controller 106.

In step 610, the warm-up period is assumed to have elapsed and the controller 106 now decides whether the ground moisture signal from the bridge 104 exceeds a user-selectable moisture threshold. If the ground moisture signal is the greater of the two signals, or if the signals are equal, then the controller 106 proceeds to step 612. If the threshold is the greater signal, then the controller 106 proceeds to step 614. In any case, the controller 106 removes the electrical power from the bridge 104 and the sensor 102 at the end of the sensing period.

In step 612, controller 106 latches the associated watering valve or valves 110 in the OFF state (i.e., not watering) for the duration of the watering period established by timer 101. The logic 600 then proceeds to step 616.

In step 614, the controller 106 latches the associated watering valve or valves 110 in the ON state (i.e., watering) for the duration of the watering period established by timer 101. The logic 600 then proceeds to step 616.

In step 616, it is assumed that the programmed watering period is now over. In response, the timer 101 de-energizes (i.e., shuts off) the 24 VAC output circuit.

In step 618, the de-energization of step 616 results in the removal of power from the controller 106 and the associated watering valve or valves 110, if such were energized during step 614. The controller 106 and the related sensor 102, bridge circuit 104 and valve 110 are now effectively OFF.

In step 620, the logic 600 determines if future watering times are programmed into the timer 101. If so, then the timer 101 waits for the next programmed watering time to occur and the logic 600 begins again at step 602. If not, then the logic 600 ends at step 620.

The operating logic 600 just described is typical of one preferred embodiment of the invention. In another embodiment, the timer 101 would end one programmed watering period at step 620 and begin another at step 602, with a controller 152 responding by completing the watering of one irrigation zone and progressively executing steps 602–618 for the watering of another irrigation zone. This iterative process would is continue until all of the programmed watering periods and their associated irrigation zones had been processed (i.e., watered or not watered) by the controller 152 and other related elements. Other operating sequences corresponding to other embodiments of the invention are also possible.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An apparatus for sensing ground moisture and producing a variable electrical capacitance indicative of ground moisture, comprising:
    a shell which is water permeable and restrictive against influx of dirt therethrough, said shell defining an internal surface which defines an internal cavity therein;
    granular fill material within the internal cavity of the shell and against substantial portions of the internal surface to conduct moisture therefrom;
    first and second electrodes arranged within the internal cavity in proximity to the granular fill material, said first and second electrodes having dielectric coverings thereon to prevent conduction of electrical current between the electrodes and the granular fill material.

2. An apparatus according to claim 1 wherein said first and second electrodes are arranged in an approximately parallel relationship within said internal cavity.

3. An apparatus according to claim 1 wherein said first and second electrodes are lineal electrodes arranged in an approximately parallel relationship within said internal cavity.

4. An apparatus according to claim 1 wherein said first and second electrodes are lineal electrodes arranged in an approximately parallel relationship which extends along a convoluted path within said internal cavity.

5. An apparatus according to claim 1 wherein said first and second electrodes are lineal electrodes arranged in an approximately parallel relationship which extends along an approximately helical path within said internal cavity.

6. An apparatus according to claim 1 wherein said first and second electrodes are arranged in an approximately parallel and helical arrangement within said internal cavity.

7. An apparatus according to claim 1 wherein said granular fill material is made from granules which are predominantly larger than about 0.01 inches in diameter.

8. An apparatus according to claim 1 wherein said granular fill material is made from granules which are predominantly larger than about 0.01 inches and predominantly less than about 0.1 inches in diameter.

9. An apparatus according to claim 1 wherein said granular fill material is made from granules which are predominantly larger than about 0.02 inches and predominantly less than about 0.05 inches in diameter.

10. An apparatus for sensing ground moisture and producing a variable electrical capacitance indicative of ground moisture, comprising:
    a shell which is water permeable and restrictive against influx of dirt therethrough, said shell defining an internal surface which defines an internal cavity therein;
    granular fill material within the internal cavity of the shell and against substantial portions of the internal surface to conduct moisture therefrom;
    at least one electrode support positioned within the internal cavity;
    first and second electrodes supported by said at least one electrode support and arranged within the internal cavity in proximity to the granular fill material, said first and second electrodes having dielectric coverings thereon to prevent conduction of electrical current between the electrodes and the granular fill material.

11. An apparatus according to claim 10 wherein said at least one electrode support is made from a water resistant material.

12. An apparatus according to claim 10 wherein said first and second electrodes are arranged in an approximately parallel relationship in an arrangement trained about the at least one electrode support.

13. An apparatus according to claim 10 wherein said first and second electrodes are linear electrodes arranged in an approximately parallel relationship in an arrangement trained about the at least one electrode support.

14. An apparatus according to claim 10 wherein said first and second electrodes are linear electrodes arranged in an approximately parallel relationship in an arrangement trained about the at least one electrode support to form a convoluted electrode route.

15. An apparatus according to claim 10 wherein said first and second electrodes are linear electrodes arranged in an approximately parallel relationship in an arrangement trained about the at least one electrode support to form a helical electrode route.

16. An apparatus according to claim 10 wherein said first and second electrodes are linear electrodes arranged in an approximately parallel relationship in an arrangement trained about the at least one electrode support to form a helical electrode route having approximately equal helical advance pitch between adjacent turns of the helical arrangement.

17. An apparatus according to claim 10 wherein said granular fill material is made from granules which are predominantly larger than about 0.01 inches in diameter.

18. An apparatus according to claim 10 wherein said granular fill material is made from granules which are predominantly larger than about 0.01 inches and predominantly less than about 0.1 inches in diameter.

19. An apparatus according to claim 10 wherein said granular fill material is made from granules which are predominantly larger than about 0.02 inches and predominantly less than about 0.05 inches in diameter.

20. An apparatus for sensing ground moisture and producing a variable electrical capacitance indicative of ground moisture, comprising:

a shell which is water permeable and restrictive against influx of dirt therethrough, said shell defining an internal surface which defines an internal cavity therein;

granular fill material within the internal cavity of the shell and against substantial portions of the internal surface to conduct moisture therefrom, said granular fill material having granules which are predominantly larger than about 0.01 inches in diameter;

at least one electrode support made from a moisture resistant material and positioned within the internal cavity;

first and second electrodes supported by said at least one electrode support and arranged within the internal cavity in proximity to the granular fill material, said first and second electrodes having dielectric coverings thereon to prevent conduction of electrical current between the electrodes and the granular fill material.

21. An apparatus according to claim 20 wherein said granular fill material is made from granules which are predominantly larger than about 0.01 inches and predominantly less than about 0.1 inches in diameter.

22. An apparatus according to claim 20 wherein said granular fill material is made from granules which are predominantly larger than about 0.02 inches and predominantly less than about 0.05 inches in diameter.

23. An apparatus forming an ancillary circuit for use with a capacitive soil moisture sensor, comprising:
an oscillator for providing a voltage varying excitation signal having an oscillation frequency;
a bridge circuit coupled to the oscillator to detect variations in capacitance demonstrated by a sensor connected to the ancillary circuit, said bridge circuit having a sensor leg which defines sensor terminals to which the capacitive soil moisture sensor is connectable thereto;
a rectifier coupled to the bridge circuit to rectify imbalance demonstrated by the bridge and provide a rectifier signal therefrom;
at least one filter coupled to the bridge circuit and rectifier to help smooth the rectifier signal and provide a moisture output signal therefrom.

24. An apparatus according to claim 23 wherein the oscillation frequency is in the range of about 10 kHz to about 250 kHz.

25. A bridge circuit in accordance with claim 23 wherein the oscillation frequency is in the range form about 80 kHz to about 150 kHz.

26. A bridge circuit in accordance with claim 23 further comprising a voltage regulator for regulating the voltage in close proximity to the oscillator.

27. A bridge circuit in accordance with claim 23 further comprising at least one coupling capacitor interposed between the oscillator and bridge circuit.

28. A bridge circuit in accordance with claim 23 further comprising a thermistor forming a part of the bridge circuit to provide temperature adjustment.

29. An apparatus forming an ancillary circuit for use with a capacitive soil moisture sensor, comprising:
an oscillator for providing a voltage varying excitation signal having an oscillation frequency, the oscillation frequency being in the range of about 10 kHz to about 250 kHz;
a voltage regulator for regulating the voltage in close proximity to the oscillator;
a bridge circuit coupled to the oscillator to detect variations in capacitance demonstrated by a sensor connected to the ancillary circuit, said bridge circuit having a sensor leg which defines sensor terminals to which the capacitive soil moisture sensor is connectable thereto;
a thermistor forming a part of the bridge circuit to provide temperature adjustment;
a rectifier coupled to the bridge circuit to rectify imbalance demonstrated by the bridge and provide a rectifier signal therefrom;
at least one filter coupled to the bridge circuit and rectifier to help smooth the rectifier signal and provide a moisture output signal therefrom.

30. A bridge circuit in accordance with claim 29 further comprising at least one coupling capacitor interposed between the oscillator and bridge circuit.

31. An apparatus according to claim 29 wherein the oscillation frequency is in the range of 10 kHz to 250 kHz.

32. A bridge circuit in accordance with claim 29 wherein the oscillation frequency is in the range form about 80 kHz to about 150 kHz.

33. An irrigation controller comprising:
a comparator configured to be coupled to a moisture signal from an external source and coupled to a selective threshold signal, the comparator being further configured to provide a comparison signal responsive to comparing the moisture signal and the selective threshold signal;
an oscillator configured to provide a clock signal;
a counter coupled to the clock signal and configured to provide a bridge enable signal and a valve enable signal and an oscillator freeze signal;
a switch circuit configured to selectively provide electrical power to an external load responsive to the bridge enable signal; and
an optical switch circuit configured to selectively provide electrical power to another external load responsive to the valve enable signal and the comparison signal, the oscillator being further configured to halt the providing the clock signal responsive to the oscillator freeze signal.

34. An irrigation controller in accordance with claim 33 wherein the counter is further configured to provide the bridge enable signal for a first period of time and to provide the valve enable signal for a second period of time, and wherein the second period of time is contemporaneous with a later portion of the first period of time.

35. An irrigation controller in accordance with claim 33 wherein the timer is further configured to provide the oscillator freeze signal after the first period of time.

36. An irrigation controller in accordance with claim 33 wherein the irrigation controller is configured to be coupled to an external source of electrical power.

37. An irrigation controller in accordance with claim 33 and further configured to reset the counter responsive to a loss and a subsequent restoration of the electrical power from the external source.

38. An irrigation controller in accordance with claim 33 wherein the optical switch circuit is further configured to selectively provide the electrical power to another external load during provision of the electrical power from the external source to the irrigation controller.

39. An apparatus for controlling irrigation, comprising:
a sensor including a pair of spaced insulated conductors, the pair of spaced insulated conductors supported in a fill material within a water-permeable shell, the sensor configured to provide an electrical capacitance corresponding to detected moisture which is indicative of ambient moisture concentration about the water-permeable shell;

an ancillary circuit electrically coupled to the sensor and configured to provide an electrical moisture signal corresponding to the electrical capacitance of the sensor; and a controller electrically coupled to the ancillary circuit and configured to selectively provide a valve control signal responsive to a comparison of the electrical moisture signal and a selective threshold signal.

40. An apparatus according to claim 39 wherein the controller is further configured to energize the bridge circuit for a period of time and to ignore the electrical moisture signal for a portion of the period of time prior to the selectively providing the valve control signal.

41. An apparatus according to claim 39 wherein the controller is further configured to be electrically coupled to an external source of electrical power by way of an isolation transformer.

42. An apparatus according to claim 39 wherein the controller is further configured to energize the ancillary circuit and to perform the comparing and the selectively providing from time to time in correspondence to a provision of power from the external source.

43. An apparatus according to claim 39 and further comprising a plurality of sensors and a plurality of bridge circuits each electrically coupled to one of the plurality of sensors, the controller being electrically coupled to the plurality of bridge circuits and configured to selectively provide a plurality of valve control signals each responsive to a comparison of an electrical moisture signal from the corresponding bridge circuit and a corresponding selective threshold signal.

44. A method for controlling an irrigation system comprising:

installing a sensor including a pair of spaced helically wound insulated conductors supported in a sand fill within a zone to be irrigated;

coupling a bridge circuit to the sensor;

coupling a controller to the bridge circuit;

energizing the bridge circuit for a period of time using the controller;

exhibiting an electrical capacitance representative of a moisture concentration within the zone using the sensor;

developing an electrical moisture signal corresponding to the electrical capacitance for the period of time using the bridge circuit;

ignoring the electrical moisture signal for a portion of the period of time using the controller;

comparing the electrical moisture signal with a selective threshold signal using the controller; and selectively providing a valve control signal to at least one valve within the zone responsive to the comparing using the controller.

45. A method according to claim 44 wherein the energizing and the exhibiting and the developing and the ignoring and the comparing and the selectively providing are performed from time to time responsive to a provision of electrical power from an external source.

46. A method of controlling an irrigation system having two zones, comprising:

providing electrical power for a watering period of time to a set of contacts on a controller using a time clock;

conducting electrical power to a bridge circuit coupled to a sensor for a sensing period of time defined by the controller;

sensing ground moisture concentration within a zone with the sensor and providing a corresponding moisture signal to the controller using the bridge circuit;

ignoring the moisture signal for a first portion of the sensing period of time using the controller;

comparing the moisture signal to a selectively adjustable threshold signal using the controller;

selectively energizing an external load associated with the zone for a later portion of the watering period of time responsive to the comparing, the later portion beginning after the sensing period of time has ended;

removing electrical power from the set of contacts on the controller after completion of the watering period of time using the time clock;

providing electrical power for a second watering period of time to a second set of contacts on the controller using the time clock, the second watering period beginning after completion of the watering period;

conducting electrical power to a second bridge circuit coupled to a second sensor for a second sensing period of time defined by the controller;

sensing ground moisture concentration within a second zone with the second sensor and providing a corresponding second moisture signal to the controller using the second bridge circuit;

ignoring the second moisture signal for a first portion of the second sensing period of time using the controller;

comparing the second moisture signal to a second selectively adjustable threshold signal using the controller;

selectively energizing a second external load for a later portion of the second watering period of time responsive to the comparing, the later portion of the second watering period beginning after the second sensing period of time has ended; and removing electrical power from the second set of contacts on the controller upon completion of the second watering period of time using the time clock.

* * * * *